United States Patent
Jackson (12)

(10) Patent No.: US 7,332,004 B2
(45) Date of Patent: Feb. 19, 2008

(54) EFFLUENT FILTERING AND CONTAINMENT APPARATUS

(76) Inventor: Jeffrey W. Jackson, 2395 Eastwood St., Portage, IL (US) 46368

( * ) Notice: Subject to any disclaimer, the term of this patent is extended or adjusted under 35 U.S.C. 154(b) by 317 days.

(21) Appl. No.: 10/956,683

(22) Filed: Oct. 1, 2004

(65) Prior Publication Data

US 2006/0070363 A1    Apr. 6, 2006

(51) Int. Cl.
*B01D 35/02* (2006.01)
(52) U.S. Cl. .................. 55/350.1; 55/323; 55/326; 55/357; 55/421; 55/423; 55/486; 55/DIG. 36; 96/414; 96/415; 96/416; 126/299 D; 126/299 E; 126/299 F; 126/299 R
(58) Field of Classification Search .......... 55/350.1, 55/323, 326, 357, 421, 423, 486, DIG. 36; 96/414, 415, 416; 126/299 D, 299 E, 299 F, 126/299 R
See application file for complete search history.

(56) References Cited

U.S. PATENT DOCUMENTS 4,869,236 A * 9/1989 Blough ............... 126/299 R
4,923,725 A * 5/1990 Zafiroglu ............... 428/36.4
5,814,115 A * 9/1998 Allen et al. ............ 55/350.1
6,210,457 B1 * 4/2001 Siemers .................... 55/429
6,648,937 B1 * 11/2003 Nguyen et al. ............ 55/421
6,676,723 B2 * 1/2004 Chwala .................... 55/421
6,814,769 B1 * 11/2004 Stefanucci ............. 55/385.1
2002/0174774 A1 * 11/2002 Chen ......................... 96/416

\* cited by examiner

*Primary Examiner*—Duane Smith
*Assistant Examiner*—Minh-Chau T. Pham
(74) *Attorney, Agent, or Firm*—James Ray & Assoc

(57) ABSTRACT

An apparatus for filtering and containing grease or other effluent discharged from a drain spout of an exhaust fan includes a hollow housing and top and bottom portions covering each end thereof. A filter element disposed within the housing for filtering the effluent. A first aperture is provided in a top portion for enabling entry of the effluent into the housing and a plurality of second apertures is provided in a bottom portion for enabling passage of a filtered effluent. An apparatus is adapted for attachment to a roof surface or to a duct housing attached to the exhaust fan. The housing may include a transparent portion for visually identifying the saturation magnitude of the filter element.

24 Claims, 2 Drawing Sheets

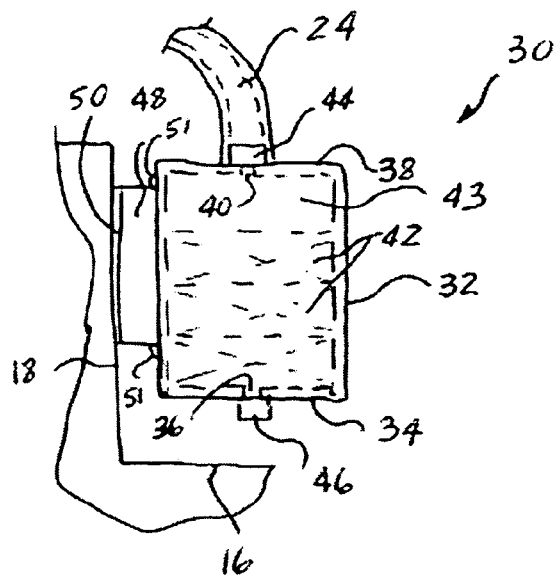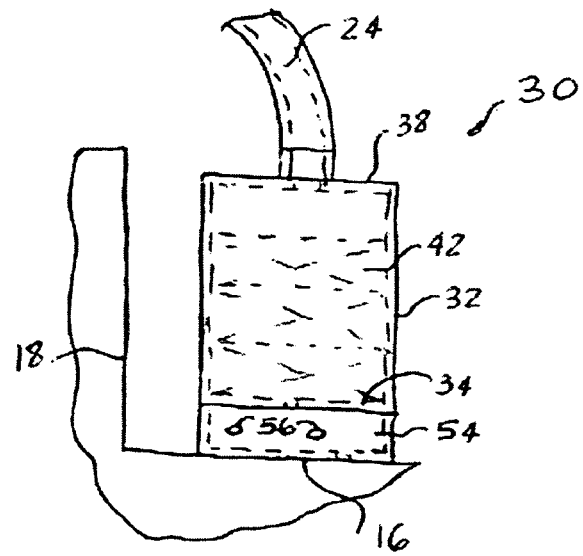
FIG. 2  FIG. 3
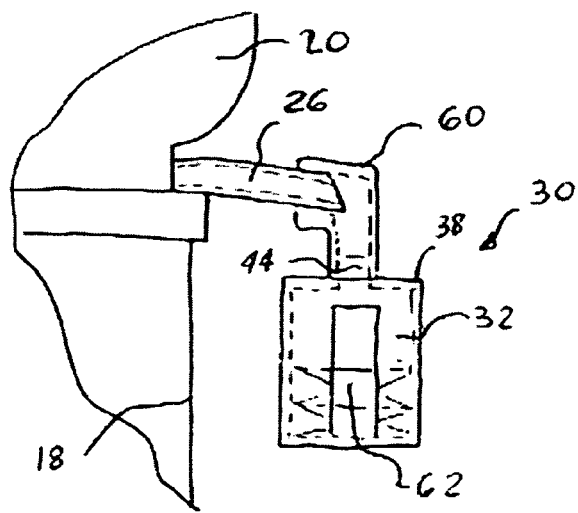
FIG. 4

EFFLUENT FILTERING AND CONTAINMENT APPARATUS

FIELD OF THE INVENTION

The present invention relates, in general, to an effluent filter and, more particularly, the instant invention relates to an effluent filter employed in commercial food preparation and heating, ventilating and air conditioning systems and, still more particularly, the instant invention relates to an effluent filter employed in commercial food preparation and heating, ventilating and air conditioning systems having a rooftop mounted exhaust fan.

BACKGROUND OF THE INVENTION

The following background information is provided to assist the reader to understand the environment in which the invention will typically be used. The terms used herein are not intended to be limited to any particular narrow interpretation unless specifically stated otherwise in this document.

The problems with discharging effluent matter, such as grease, through roof mounted exhaust fan systems are well known in the field of commercial food preparation and commercial heating, ventilating and air conditioning systems. The grease used in commercial food preparation as well as other products of combustion accumulates in the exhaust stack and is discharged into the atmosphere through roof top mounted exhaust fans. The discharge corrodes and degrades the roof surface and poses a fire hazard as the grease may ignite. The restoration of the roof surface is an expensive and time consuming effort.

To mitigate the grease discharge problems, grease containment and filter systems have been employed to collect the discharged grease.

U.S. Pat. No. 6,391,074 to McCrary and U.S. Pat. No. 6,143,047 to Jodoin et al. teach roof mounted containment assemblies that surround the exhaust fan and employ replaceable filter elements to collect the grease discharge. However, these systems are expensive to install and enable exposure of the grease discharge to the environment.

U.S. Pat. No. 5,814,115 to Allen et al. teaches, in one aspect, a grease filter system for use with a bottom discharge exhaust fan that includes a receptacle and a filter element removably supported within the receptacle. The receptacle further includes a lid with an opening through which grease, condensed steam, water and other products of combustion can enter the system. A dispersion tray is disposed below the lid for guiding the discharged grease into the receptacle. A plurality of apertures is provided at the bottom portion of the receptacle to retain grease and other viscous fluids while allowing condensed steam, water and other products of combustion to pass through the filter element and exit the receptacle through the apertures.

While offering improved grease containment, the system is roof mounted and requires careful handling of the filter element during replacement effort so as not to incur spillage. Furthermore, the inclusion of the dispersion tray increases the installation costs.

In another aspect, U.S. Pat. No. 5,814,115 to Allen et al. teaches a filter system for use with a side discharge exhaust fan that includes a receptacle secured to the side of the duct housing connected to the exhaust fan housing. A filter element is removably disposed within the receptacle and a lid with a narrow opening, which is aligned with the side drain spout, is provided for receiving the discharged grease and other effluent matter. A dispersion tray is disposed below the lid for guiding it into the filter element.

It has been found that such system, when not aligned properly, enables discharged grease to spill onto the roof surface.

Additionally, it is well known that air ventilating exhaust fans accumulate grease and other effluent matter on the interior wall surface of the fan housing and such grease is being discharged onto the roof by rain water.

Therefore, it is desirable to provide an effluent filtering and containment apparatus that improves containment of the grease and other effluent discharge, reduces installation costs and minimizes difficulties with handling saturated filter elements during replacement effort.

SUMMARY OF THE INVENTION

The present invention discloses an apparatus for filtering and containing effluent discharged from a drain spout of an exhaust fan employed in commercial food preparation and heating, ventilating and air conditioning systems.

The apparatus includes a hollow housing of a predetermined length and a predetermined cross section terminated with top and bottom portions at each end thereof. The top portion contains an aperture for enabling entry of the discharged influent into the housing. A filter element is disposed within the housing for filtering such discharged effluent. The bottom portion contains a plurality of apertures arranged in a predetermined pattern for enabling passage of the filtered effluent from the housing.

In a first aspect, the top and bottom portions are integral with the housing permanently capturing the filter element and positively containing effluent discharge such as viscous grease.

In a second aspect, the top portion is removably secured to the housing enabling insertion and removal of the filter element.

The apparatus may be adapted with a flanged portion connected to the housing for secure attachment to the duct housing of the exhaust fan or adapted for support against the roof surface.

The housing may include a transparent portion for visually identifying the saturation magnitude of the filter element.

OBJECTS OF THE INVENTION

It is, therefore, one of the primary objects of the present invention to provide an effluent filtering and containment apparatus.

It is yet another object of the present invention to provide an effluent filtering and containment apparatus for use with exhaust fans.

It is yet another object of the present invention to provide an effluent filtering and containment apparatus for use with roof mounted exhaust fans employed in commercial food preparation and heating, ventilating and air conditioning systems.

It is a further object of the present invention to provide an effluent filtering and containment apparatus for use with roof mounted exhaust fans employed in commercial food preparation and heating, ventilating and air conditioning systems that elliminate exposure of the discharged grease to atmosphere.

It is yet a further object of the present invention to provide an effluent filtering and containment apparatus for use with roof mounted exhaust fans employed in commercial food preparation and heating, ventilating and air conditioning systems that is universally suitable for side and bottom mounted grease discharge drains employed in such systems.

It is additional object of the present invention to provide an effluent filtering and containment apparatus for use with roof mounted exhaust fans employed in commercial food preparation and heating, ventilating and air conditioning systems that provides ease of filter replacement.

In addition to the various objects and advantages of the present invention which have been generally described above, there will be various other objects and advantages of the invention that will become more readily apparent to those persons who are skilled in the relevant art from the following more detailed description of the invention, particularly, when the detailed description is taken in conjunction with the attached drawing figures and with the appended claims.

BRIEF DESCRIPTION OF THE DRAWINGS

FIG. 2 is a partial elevation view of an exhaust system with a bottom discharge incorporating an effluent filtering and containment apparatus of a presently preferred embodiment of the present invention;

FIG. 3 is a partial elevation view of the exhaust system with a bottom discharge incorporating an effluent filtering and containment apparatus of an alternative embodiment of the present invention; and FIG. 4 is a partial elevation view of an exhaust system with a side discharge incorporating an effluent filtering and containment apparatus of the present invention.

Figure 1:
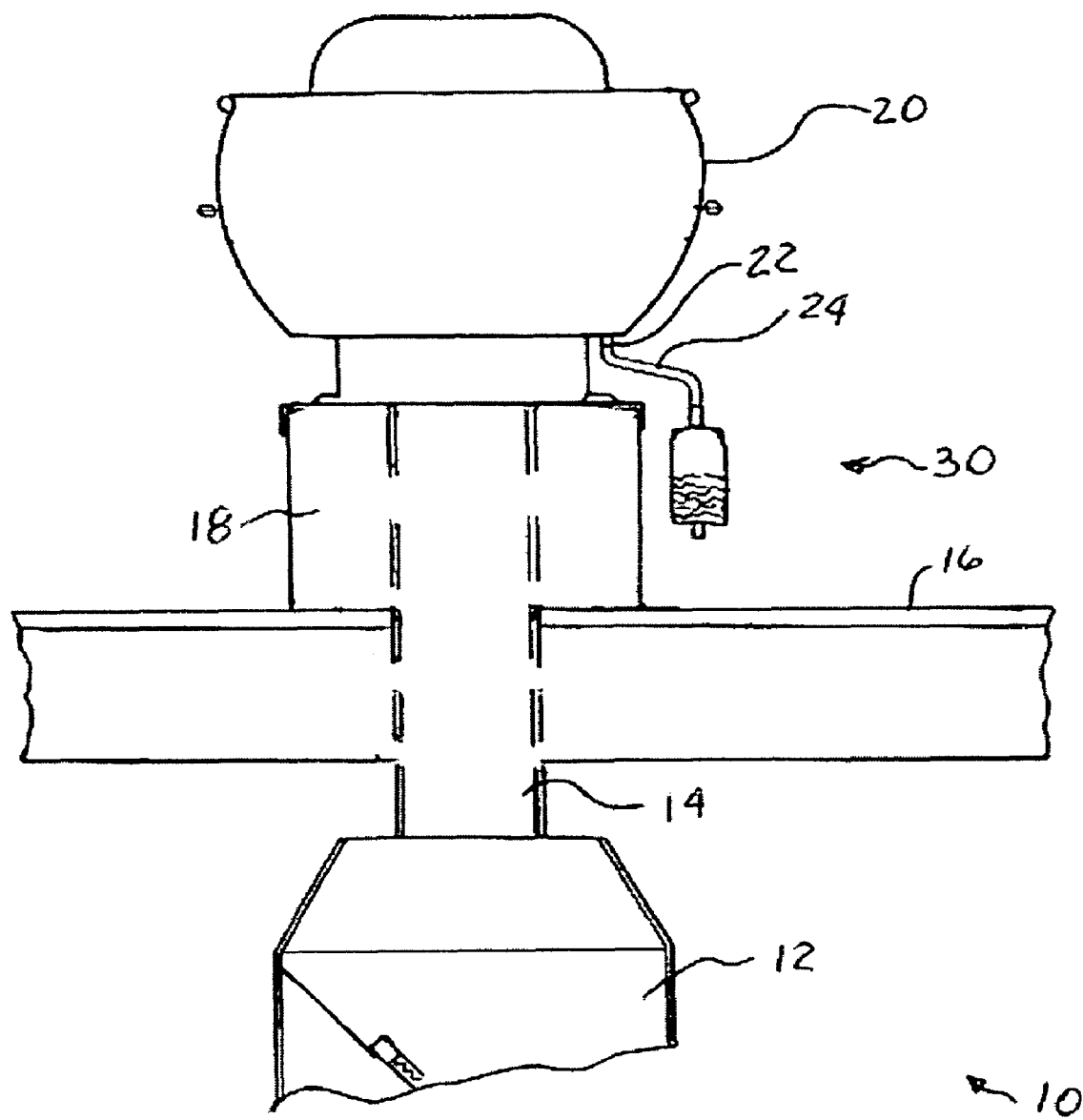
FIG. 1 is an elevation view of an exhaust system with a bottom discharge incorporating an effluent filtering and containment apparatus of the present invention.

DESCRIPTION OF THE PRESENTLY PREFERRED AND VARIOUS ALTERNATIVE EMBODIMENTS OF THE INVENTION

Before describing the invention in detail, the reader is advised that, for the sake of clarity and understanding, identical components having identical functions have been marked where possible with the same reference numerals in each of the Figures provided in this document.

The structure and operation of the present invention will be explained in combination with a roof mounted exhaust fan for commercial food preparation equipment as use thereof in other applications will be obvious to those skilled in the relevant art form.

The reader's attention is directed to FIG. 1 showing a roof mounted exhaust system, generally designated 10, in combination with an effluent filtering and containment apparatus, generally designated 30, of the present invention. The exhaust system 10 includes a hood 12 disposed adjacent the commercial food preparation equipment, which is not shown but is well known in the art. The hood 12 is adapted with a duct 14 extending into a first rigid structure being an outer duct housing 18 through a second rigid structure being a roof 16. The duct 14 is connected to a roof mounted exhaust fan 20 having a drain spout 22 disposed within a bottom portion thereof. Effluents, such as grease and other products of combustion, are vented through the duct 14 and exhaust fan 20 and are discharged through such drain spout 22. It will be appreciated that a grease contained within the effluent matter is viscous.

The effluent filtering and containment apparatus 30 of the preferred embodiment is best illustrated in FIG. 2. Such effluent filtering and containment apparatus 30 includes a hollow housing 32 of a predetermined length and predetermined cross section which is open at each end. The first end is provided for receiving a drain tube 24 securely attached to the drain spout 22. The discharged effluent received through the first end engages at least one filter element 42 of a predetermined material and a predetermined thickness, which is disposed within the housing 32.

In an alternative embodiment, the first end may be adapted with a top portion 38 covering such first end and having at least one first aperture 40 for receiving such drain tube 24.

A means 34 disposed within the housing 32 at a second end thereof is provided for supporting such at least one filtering element 42 within the housing 32 and enabling forming a housing portion 43 of a predetermined volume disposed intermediate such first end or the top portion 38 and such at least one filtering element 42 for holding a predetermined amount of effluent, such as grease, rain water and other products of combustion discharged from the exhaust fan 20 through the drain spout 22.

Such means 34 may be a plurality of first tab portions of a predetermined size extending inwardly from an interior surface of the housing 32, but preferably, such plurality of first tab portions 34 form a continuous ledge 35 either rigidly attached or integral to the housing 32 and, yet more preferably, the means 34 is a bottom portion 34 covering the second end of the housing 32 and having at least one second aperture 36 for enabling passage of the filtered effluent matter.

In operation, the rain water, grease and any other products of combustion will enter holding portion 43 through the drain tube 24 and at least one first aperture 40. The grease will saturate the at least one filtering element 42 and will be contained thereby within the housing 32 enabling the filtered effluent such as rain water and other products of combustion to pass through the at least one second aperture 36. To facilitate such passage, the at least one second aperture 36 may be further disposed within the housing 32 adjacent the second end thereof.

In the most preferred embodiment of the present invention, the top and bottom portions 38 and 34 respectively are permanently attached or integral to the housing 32 thus securely containing at least one filter element 42 and, more importantly, securely containing the discharged grease and other effluent matter.

In order to facilitate installation and replacement of the effluent filtering and containment apparatus 30, a top portion 38 may be adapted with a first fitting 44 being aligned with such at least one first aperture 40 for removable attachment to the drain tube 24. Preferably, such first fitting 44 is a well known barb fitting 44 of a predetermined diameter corresponding to the internal diameter of the drain tube 24 for an interference fit attachment thereto.

Attachment of the drain tube 24 to the first fitting 44 may be alternatively or additionally achieved with the use of well known securing means including but not limited to a clamp, wire, ties, tape or fasteners.

Preferably, such at least one second aperture 36 is a plurality of second apertures 36 disposed in a predetermined pattern within the bottom portion 34 to facilitate passage of the filtered rain water and other products of combustion therethrough. Alternatively, such bottom portion 36 may be adapted with a second fitting 46 aligned with such at least one second aperture 36 for controlled discharge of the filtered rain water and other products of combustion.

In applications requiring a more permanent mounting, the effluent filtering and containment apparatus 30 may be adapted with a mounting means 48 having a mounting portion 50 for attachment to the duct outer housing 18 with well known fasteners.

The mounting means 48 may be permanently attached to the effluent filtering and containment apparatus 30 or the effluent filtering and containment apparatus 30 may be provided with a means 51 for removable attachment to the mounting means 48 without the use of fasteners. For example, such means 51 may be at least one second tab portion 51 for snap in engagement with the mounting means 48. Or, alternatively, the mounting means 48 may be provided with a cradle portion (not shown) for housing the effluent filtering and containment apparatus 30.

It will be appreciated that such preferred embodiment of the effluent filtering and containment apparatus 30 enables ease of installation and replacement while eliminating handling of the saturated at least one filter element 42 and, more importantly, eliminating spillage of the grease matter onto the roof 16 during replacement effort of the at least one filter element 42.

Alternatively, the top portion 38 may be adapted for removable attachment to the housing 32 enabling individual replacement of the at least one filter element 42.

In an alternative embodiment, best illustrated in FIG. 3, the effluent filtering and containment apparatus 30 may be provided with an extension means 54 attached to the housing 32 or the bottom portion 34 for supporting the effluent filtering and containment apparatus 30 against the roof 16. Preferably, such extension means 54 are integral to the housing 32 or the bottom portion 34 and may contain at least one third aperture 56 enabling passage of the filtered rain water and other products of combustion. It will be appreciated that such extension means 54 will accommodate a roof 16 having a horizontal or a slopped surface.

It will be appreciated that when such extension means 54 are integral to the housing 32, the housing 32 and the bottom portion 34 will be adapted for holding such at least one filter element 42 at a first predetermined distance from the roof 16 and such at least one third aperture 56 will be disposed at a second predetermined distance from such roof 16 to enable passage of the filtered rain water and other products of combustion.

In applications wherein such exhaust fan 20 incorporates a side discharge drain 26, as best illustrated in FIG. 4, the effluent filtering and containment apparatus 30 may be adapted with a transition means 60 having one end configured for attachment to the side discharge drain 26 and having a second end configured for attachment to the first fitting 44 or to the at least one first aperture 40.

Alternatively such at least one first aperture 40 may be aligned with the end of the side discharge drain 26 and such top portion 38 may be inwardly slopped to facilitate containment of the discharged matter.

The effluent filtering and containment apparatus 30 may be provided with a means 62 for visually determining a saturation magnitude of the at least one filter element 42. Preferably, such means 62 is at least one transparent portion 62, best shown in FIG. 4, at least partially extending through the housing 32. It will be appreciated that such saturation will alter a predetermined original color of the at least one filter element 42 and the saturation magnitude necessitating replacement thereof will be readily seen through such at least one transparent portion 62.

Those skilled in the art will readily understand that the effluent filtering and containment apparatus 30 of the present invention will enable filtering and containment of the effluent discharge from air ventilating exhaust fans wherein dirt and grease accumulates on the interior wall surface of the fan housing and are being discharged onto the roof by rain water. The effluent filtering and containment apparatus 30 of the present invention will further enable filtering and containment of the effluent discharge from roof mounted air conditioning units.

While the presently preferred embodiment of the instant invention has been described in detail above in accordance with the patent statutes, it should be recognized that various other modifications and adaptations of the invention may be made by those persons who are skilled in the relevant art without departing from either the spirit or the scope of the appended claims.

I claim:

1. An apparatus for filtering and containing a discharged effluent, said apparatus comprising:
   a) a hollow housing having a predetermined length and a predetermined cross section;
   b) at least one filter means of a predetermined material and predetermined thickness disposed within said housing intermediate first and second ends thereof for filtering said effluent which enters said hollow housing and contacts an upper surface of said at least one filter means, wherein said at least one filter means is positioned so as to provide unobstructed passage of said influent after said effluent enters said hollow housing and before it contacts said upper surface of said at least one filter means; and
   c) a means inwardly disposed within said housing adjacent a second end thereof for supporting said at least one filter means and for forming a housing portion of a predetermined volume disposed intermediate said first end and said upper surface of said at least one filter means for holding a predetermined amount of said effluent.

2. An apparatus, according to claim 1, wherein said apparatus further includes a top portion covering said first end of said housing and having means disposed therein for enabling entry of said effluent into said housing.

3. An apparatus, according to claim 2, wherein said means for enabling entry of said effluent into said housing includes at least one first aperture disposed within said top portion.

4. An apparatus, according to claim 3, wherein said means for enabling entry of said effluent into said housing includes a first fitting aligned with said at least one first aperture.

5. An apparatus, according to claim 1, wherein said apparatus includes a first means for attachment of said apparatus to a drain spout discharging said effluent.

6. An apparatus, according to claim 5, wherein said first means for attachment to said drain spout is one of a drain tube and a transition means having a first end adapted for attachment to said drain spout and a second end adapted for attachment to one of said at least one first aperture and said first fitting.

7. An apparatus, according to claim 6, wherein said first fitting includes at least one barb portion of a predetermined diameter forming an interference fit with one of said drain tube and said transition means.

8. An apparatus, according to claim 6, wherein one of said drain tube and said transition means is attached to said first fitting with an attachment means selected from a group consisting of a clamp, wire, tie, tape and fastener.

9. An apparatus, according to claim 1, wherein said filter supporting means is one of a plurality of first tab portions and a continuous ledge portion of a predetermined size and being one of rigidly attached and integral to said housing.

10. An apparatus, according to claim 1, wherein said filter supporting means is a bottom portion covering said second end of said housing.

11. An apparatus, according to claim 10, wherein said apparatus further includes a means for enabling passage of said filtered effluent from said housing.

12. An apparatus, according to claim 11, wherein said means for enabling passage of said filtered effluent from said housing includes at least one second aperture disposed within one of said bottom portion, said housing and a combination thereof.

13. An apparatus, according to claim 12, wherein said means for enabling passage of said filtered effluent from said housing includes a second fitting aligned with said at least one second aperture.

14. An apparatus, according to claim 12, wherein said at least one second aperture is a plurality of said second apertures disposed in a predetermined pattern.

15. An apparatus, according to claim 1, wherein said apparatus includes a second means for attachment thereof to a first rigid structure associated with said drain spout, said first rigid structure is one of vertically and horizontally disposed.

16. An apparatus, according to claim 15, wherein said second means for attachment includes a flanged portion being one of rigidly attached and integral to said housing.

17. An apparatus, according to claim 16, wherein said apparatus includes a means for removable attachment of said housing to said second means without use of fasteners.

18. An apparatus, according to claim 17, wherein said means for removable attachment is one of second tab portion attached to said housing enabling snap in engagement with said second means for attachment and cradle portion disposed within said second means for attachment enabling support of said apparatus.

19. An apparatus, according to claim 1, wherein said apparatus includes a means for supporting thereof against a second rigid structure having one of horizontal and sloped surface disposed underneath said drain spout.

20. An apparatus, according to claim 19, wherein said supporting means includes at least one third aperture for enabling passage of said filtered effluent from said housing.

21. An apparatus, according to claim 1, wherein said apparatus includes means disposed within said housing for visually determining a saturation magnitude of said at least one filter means and for facilitating replacement thereof.

22. An apparatus, according to claim 21, wherein said means for visually determining said saturation magnitude of said at least one filter means includes at least one elongated transparent portion vertically formed within a peripheral wall of said housing.

23. An apparatus, according to claim 1, wherein said effluent is a viscous product discharged from said drain spout.

24. An apparatus for filtering and containing a viscous effluent discharge from a drain spout of an exhaust fan in one of a commercial food preparation environment, heating, ventilating and air conditioning environment, and a combination thereof, said apparatus comprising:

a) a hollow housing having a predetermined length and a predetermined cross section;

b) at least one filter means of a predetermined material and predetermined thickness disposed within said housing intermediate first and second ends thereof for filtering said effluent which enters said hollow housing and contacts an upper surface of said at least one filter means;

c) a top portion covering said first end of said housing and having means disposed therein for enabling entry of said effluent into said housing, said top portion being one of rigidly attached and integral to said housing, wherein said at least one filter means is positioned so as to provide unobstructed passage of said influent after said effluent enters said hollow housing through said top portion and before it contacts said upper surface of said at least one filter means;

d) a bottom portion covering said second end of said housing and having means for enabling passage of said filtered effluent from said housing, said bottom portion being one of rigidly attached and integral to said housing;

e) wherein said at least one filter means is disposed adjacent said bottom portion and forming a housing portion of a predetermined volume disposed adjacent said first end for holding a predetermined amount of said effluent; and f) wherein said at least one filter means and said effluent captured by said at least one filter means is contained within said apparatus during replacement thereof.

* * * * *